(12) United States Patent
Inada et al.

(10) Patent No.: US 9,507,557 B2
(45) Date of Patent: Nov. 29, 2016

(54) DISPLAY DEVICE AND DISPLAY METHOD

(71) Applicant: Sharp Kabushiki Kaisha, Osaka-shi, Osaka (JP)

(72) Inventors: Ken Inada, Osaka (JP); Asahi Yamato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

(21) Appl. No.: 14/421,189

(22) PCT Filed: Aug. 21, 2013

(86) PCT No.: PCT/JP2013/072256
§ 371 (c)(1),
(2) Date: Feb. 12, 2015

(87) PCT Pub. No.: WO2014/041975
PCT Pub. Date: Mar. 20, 2014

(65) Prior Publication Data
US 2015/0205563 A1    Jul. 23, 2015

(30) Foreign Application Priority Data

Sep. 14, 2012  (JP) .................................. 2012-202623

(51) Int. Cl.
*G09G 5/00*  (2006.01)
*G06F 3/14*  (2006.01)
(Continued)

(52) U.S. Cl.
CPC ............... *G06F 3/1431* (2013.01); *G06T 1/20* (2013.01); *G09G 3/003* (2013.01); *G09G 3/3648* (2013.01);
(Continued)

(58) Field of Classification Search
CPC ...................... G09G 2330/021; G09G 3/3611; G09G 2300/023; G09G 2320/103; G09G 2360/18; G09G 2310/0275; G09G 2310/08; G09G 3/3655; G06F 3/1423
See application file for complete search history.

(56) References Cited

U.S. PATENT DOCUMENTS

2003/0020699 A1* 1/2003 Nakatani ............... G06F 3/1415
                                                        345/204
2004/0233155 A1* 11/2004 Wang .................... G06F 3/1431
                                                        345/103

(Continued)

FOREIGN PATENT DOCUMENTS

JP    2011-248355 A    12/2011
JP    2012-083724 A    4/2012
WO    2007/142190 A1   12/2007

OTHER PUBLICATIONS

Official Communication issued in International Patent Application No. PCT/JP2013/072256, mailed on Oct. 1, 2013.

*Primary Examiner* — Hau Nguyen
(74) *Attorney, Agent, or Firm* — Keating & Bennett, LLP (57) ABSTRACT

In first and second display devices (10, 20) both during pause drive (intermittent drive), an instantaneous increase in consumption power is suppressed by means of a configuration to perform control such that the scanning period in one of the two display panels is inserted during the scanning-stopped period in the other display panel, namely during the drive operation (for writing into the pixel circuit) of one of the two display panels, the drive operation (for writing) of the other display panel is not performed. Accordingly, even when a limit value of a current supply capability of a battery is low, the display device can be driven, so that a battery service life is prolonged and the operable time of a portable terminal (100) at the time of driving by the battery is increased.

7 Claims, 9 Drawing Sheets

(51) Int. Cl.
*G09G 3/00* (2006.01)
*G09G 3/36* (2006.01)
*H04N 13/00* (2006.01)
*H04N 13/04* (2006.01)
*G06T 1/20* (2006.01)

(52) U.S. Cl.
CPC ...... *H04N 13/0033* (2013.01); *H04N 13/0409* (2013.01); *G09G 2320/103* (2013.01); *G09G 2330/02* (2013.01); *G09G 2330/022* (2013.01)

(56) References Cited

U.S. PATENT DOCUMENTS

| | | | |
|---|---|---|---|
| 2008/0284934 A1* | 11/2008 | Umezaki | G02F 1/13452 349/43 |
| 2010/0090928 A1* | 4/2010 | Maeda | G02F 1/133707 345/4 |
| 2011/0267331 A1 | 11/2011 | Yamazaki et al. | |
| 2012/0062561 A1 | 3/2012 | Koyama | |

* cited by examiner

DISPLAY DEVICE AND DISPLAY METHOD

TECHNICAL FIELD

The present invention relates to a display device and a display method, and more specifically relates to a display device such as a portable terminal using a plurality.

BACKGROUND ART

In recent years, some display devices such as portable terminals provide two screens by means of two display panels. For example, in some portable type display devices with which games can be played, out of two display panels, one is taken as a high-resolution or three-dimensionally displayable display panel and the other is taken as an operation-input acceptable touch panel.

The display device such as the portable terminal as thus described is driven by a built-in battery in most cases, and is thus required to be reduced in consumption power. In recent years, therefore, there may be adopted a low-frequency drive system in which an inversion frequency is made low as a whole by providing a scanning-stopped period for bringing an applied voltage into an unchanged state just for a predetermined period.

For example, Japanese Patent Application Laid-Open No. 2011-248355 describes a configuration of a liquid crystal display device where a gate driver is driven in a first operation mode and the gate driver is not driven in a second operation mode. By inserting such a second operation mode, namely the scanning-stopped period (pause period), it is possible to meet the requirement for low consumption power in a mobile phone and the like.

PRIOR ART DOCUMENT

Patent Document

[Patent Document 1] Japanese Patent Application Laid-Open No. 2011-248355

SUMMARY OF THE INVENTION

Problems to be Solved by the Invention

However, when the configuration in the conventional display device as described in Japanese Patent Application Laid-Open No. 2011-248355 above is applied as it is to the display device having two display panels, while the effect of reducing consumption power in each of the display panels is naturally obtained, it is not possible to obtain, as a further effect, the effect of increasing duration of the built-in battery, namely operable time of the display device driven by the battery.

Accordingly, it is an object of the present invention to provide a display device, such as a portable terminal, provided with at least two display panels and capable of making duration of a built-in battery longer in a case of performing driving for inserting a scanning-stopped period (pause period) in both of the two display panels.

Means for Solving the Problems

A first aspect of the present invention is directed to a display device capable of displaying an image on each of first and second screens, the device comprising:
 a first display panel that includes a plurality of two-dimensionally arranged first pixel circuits;
 a second display panel that includes a plurality of two-dimensionally arranged second pixel circuits; and
 a drive control portion that performs driving to successively or intermittently perform a first operation of writing a signal, which corresponds to first display data for displaying an image on the first screen, into the plurality of first pixel circuits, to successively or intermittently perform a second operation of writing a signal, which corresponds to second display data for displaying an image on the second screen, into the plurality of second pixel circuits, and to prevent the first and second operations from being simultaneously performed in the case of intermittently performing both the first and second operations.

In a second aspect of the present invention, based on the first aspect of the invention, the drive control portion includes a first drive circuit that successively or intermittently performs the first operation, a second drive circuit that successively or intermittently performs the second operation; and a control portion that performs control so as to perform the first operation preferentially to the second operation in the case of both the first and second operations being intermittently performed, and to stop the second operation during the first operation.

In a third aspect of the present invention, based on the second aspect of the invention, the control portion determines whether the first and second operations are performed successively or intermittently based on the first and second display data, and controls the operations of the first and second drive circuits in accordance with a result of the determination.

In a fourth aspect of the present invention, based on the third aspect of the invention, the control portion includes a first control circuit that determines whether the first operation is performed successively or intermittently based on the first display data, and outputs an inhibition signal during a period of the first operation when determining that the first operation is intermittently performed, and a second control circuit that determines whether the second operation is performed successively or intermittently based on the second display data, and stops the second operation during an output period of the inhibition signal when determining that the second operation is intermittently performed.

In a fifth aspect of the present invention, based on the first aspect of the invention, the drive control portion determines whether or not the first or second display data is moving image data, and successively performs a write operation on the corresponding first or second pixel circuit when determining that the first or second display data is moving image data.

In a sixth aspect of the present invention, based on the first aspect of the invention, at least one of the first and second pixel circuits is provided with a thin film transistor having a semiconductor layer made of an oxide semiconductor.

A seventh aspect of the present invention is directed to a display method for displaying an image on each of first and second screens, the method comprising:
 controlling driving to successively or intermittently perform a first operation of writing a signal, which corresponds to first display data for displaying an image on the first screen, into a plurality of two-dimensionally arranged first pixel circuits included in a first display panel, to successively or intermittently perform a second operation of writing a signal, which corresponds to second display data for displaying an image on the second screen, into a plurality of two-dimensionally arranged second pixel circuits included in a second display panel, and to prevent the first and second operations from being simultaneously performed in the case of intermittently performing both the first and second operations.

Effects of the Invention

According to the first aspect of the present invention, since an instantaneous increase in consumption power is suppressed, in a case where the device is being driven by a battery, it is possible to drive the display device even when a limit value of its current supply capability is low. Hence it is possible to prolong a battery service life and increase the operable time of the display device at the time of driving by the battery.

According to the second aspect of the present invention, for example, even not in a case where the relation between the drive operation period and the pause period during the pause drive (intermittent drive) is fixed (the timing is previously decided), control is performed such that the other drive operation (for writing into the pixel circuit) is not performed during the one drive operation (for writing), and hence it is possible to reliably suppress an instantaneous increase in consumption power, prolong the battery service time, and increase the operable time at the time of driving by the battery.

According to the third aspect of the present invention, since it is determined whether successive driving or intermittent drive is performed based on the first and second display data, it is possible to perform driving suitable for contents of the display data.

According to the fourth aspect of the present invention, since control is performed such that the second control circuit is not operated during operation of the first control circuit, it is possible to reliably suppress the instantaneous increase in consumption power, and it is possible to form a simple configuration where the control is concluded between the first and second control circuits.

According to the fifth aspect of the present invention, since the drive circuit is made to successively perform the drive operation when the display data is determined to be moving image data, it is possible to make intermittent drive not performed in the case of displaying a moving image, so as to smoothly display the moving image.

According to the sixth aspect of the present invention, since the oxide semiconductor is used for the semiconductor layer of the thin film transistor, it is possible to make a current leakage very small, so as to sufficiently reduce consumption power.

According to the seventh aspect of the present invention, a similar effect to the effect in the first aspect of the present invention can be exerted in the display method.

MODES FOR CARRYING OUT THE INVENTION

Hereinafter, embodiments of the present invention will be described with reference to the attached drawings.

1. First Embodiment 1.1 Whole Structure of Display Device

Figure 1:
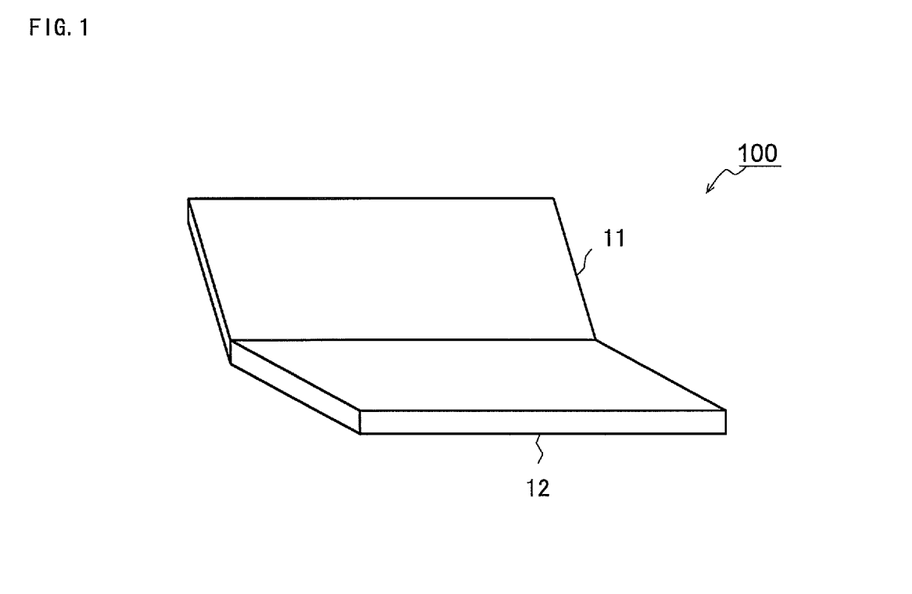
FIG. 1 is a perspective view showing a schematic configuration of a display device according to a first embodiment of the present invention.

FIG. 1 is a perspective view showing a schematic structure of a display device of a first embodiment. Herein, a display device 100 is a portable terminal having two screens, and includes a 3D liquid crystal panel 11 (hereinafter also referred to as "liquid crystal panel 11"), which can perform a display with high resolution (i.e., a large number of pixels) and high tone (i.e., a large number of display tones) and is provided with a parallax barrier that allows a naked eye stereoscopic vision, and a liquid crystal touch panel 12 (hereinafter also referred to as "liquid crystal panel 12"), which performs a display with low resolution and low tone and in which coordinates can be input by a finger or the like can input coordinates by a finger or the like.

Note that in the following embodiments, the liquid crystal panels 11, 12 are not required to be 3D liquid crystal panels or liquid crystal touch panels, and may both be similar liquid crystal panels, or be liquid crystal panels with other configuration. However, as described later, they are required to be liquid crystal panels capable of performing driving (pause drive or intermittent drive) for inserting a scanning-stopped period (pause period). Further, the display device (portable terminal) 100 includes a battery, and is driven by a current supplied from the battery when carried outdoors, for example. In a drive form in the present embodiment, in addition to obtaining the effect of reducing consumption power in the pause period as described above, it is possible to obtain the effect of increasing the duration of current supply in the battery. In this regard, the details will be described later.

As shown in FIG. 1, the liquid crystal panel 11 and the liquid crystal panel 12 are provided such that the ends of the liquid crystal panel 11 and the liquid crystal panel 12 come close to each other, and are connected by a movable mechanism (e.g., hinge), not shown, such that a relative angle formed by display surfaces of the liquid crystal panel 11 and the liquid crystal panel 12 can be changed. Note that such a movable mechanism is one example and may be omitted, and for example, positions of the liquid crystal panel 11 and the liquid crystal panel 12 may be fixed such that display screens of the liquid crystal panel 11 and the liquid crystal panel 12 are on the same plane, or the respective display screens may be provided on the front and back of the terminal device.

Figure 2:
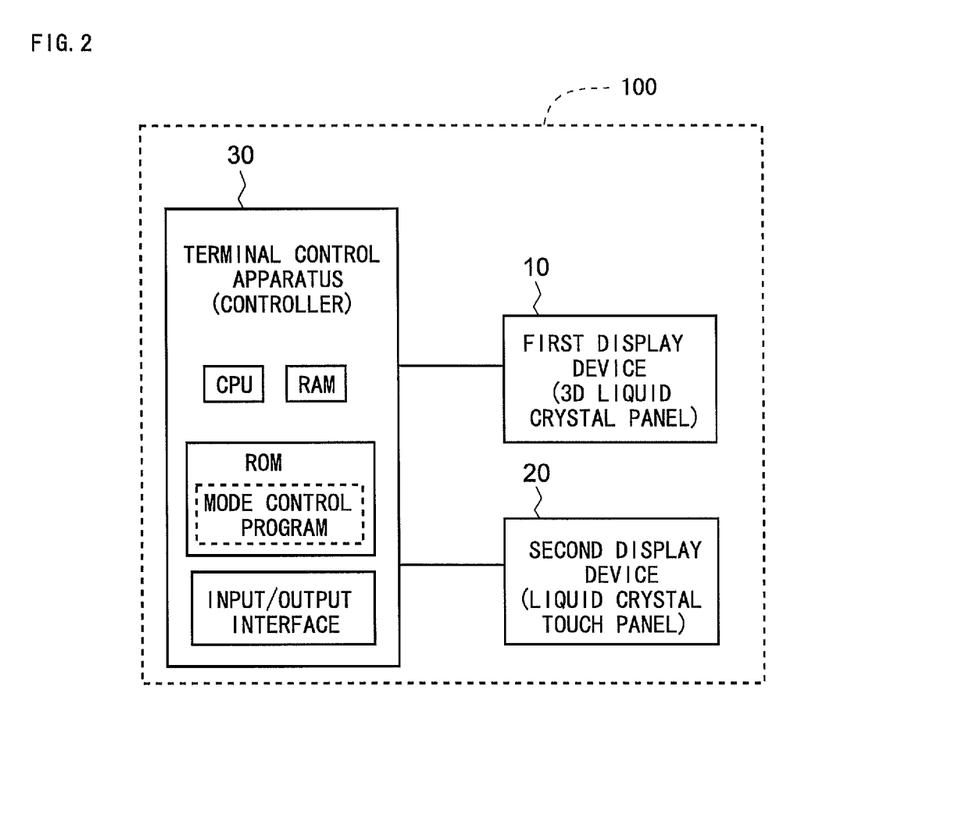
FIG. 2 is a block diagram showing the configuration of the display device in the embodiment.

FIG. 2 is a block diagram showing a whole configuration of the display device. The display device (portable terminal) 100 shown in FIG. 2 is provided with a first display device 10 (hereinafter also referred to as "3D liquid crystal panel 10") which is the 3D liquid crystal panel 11, a second display device 20 (hereinafter also referred to as "liquid crystal touch panel 20") which is the liquid crystal touch panel 12, and a terminal control apparatus 30 which is a controller.

The terminal control apparatus 30 is a general controlling computer, and is provided with a CPU, a RAM, a ROM, an input/output interface, and the like. Further, the ROM stores a mode control program that performs a variety of controls including control of switching between a pause drive (intermittent drive) mode and a normal drive (successive drive) mode, described later, which is a characteristic configuration of the present invention. Herein, the mode control program is one example and may be configured such that a control circuit for realizing part or all of functions of the mode control program is provided.

Further, the terminal control apparatus 30 outputs a video signal to the first and second display devices 10, 20. For example, when the display device 100 is a portable terminal for games, a video signal showing a game screen generated based on a game program stored in the ROM is generated, and given to the first and second display devices 10, 20. The video signal has any content, but here, it is assumed to be a moving image or a still image (an image is not frequently updated).

Next, a description will be given of configurations of the first and second display devices 10, 20 that correspond to the two liquid crystal panels 11, 12 constituting the display device (portable terminal) 100. Note that, since basic configurations of the display devices are substantially the same, the configuration of the first display device 10 will be described below.

1.2 Whole Configuration and Operation of Display Device

Figure 3:
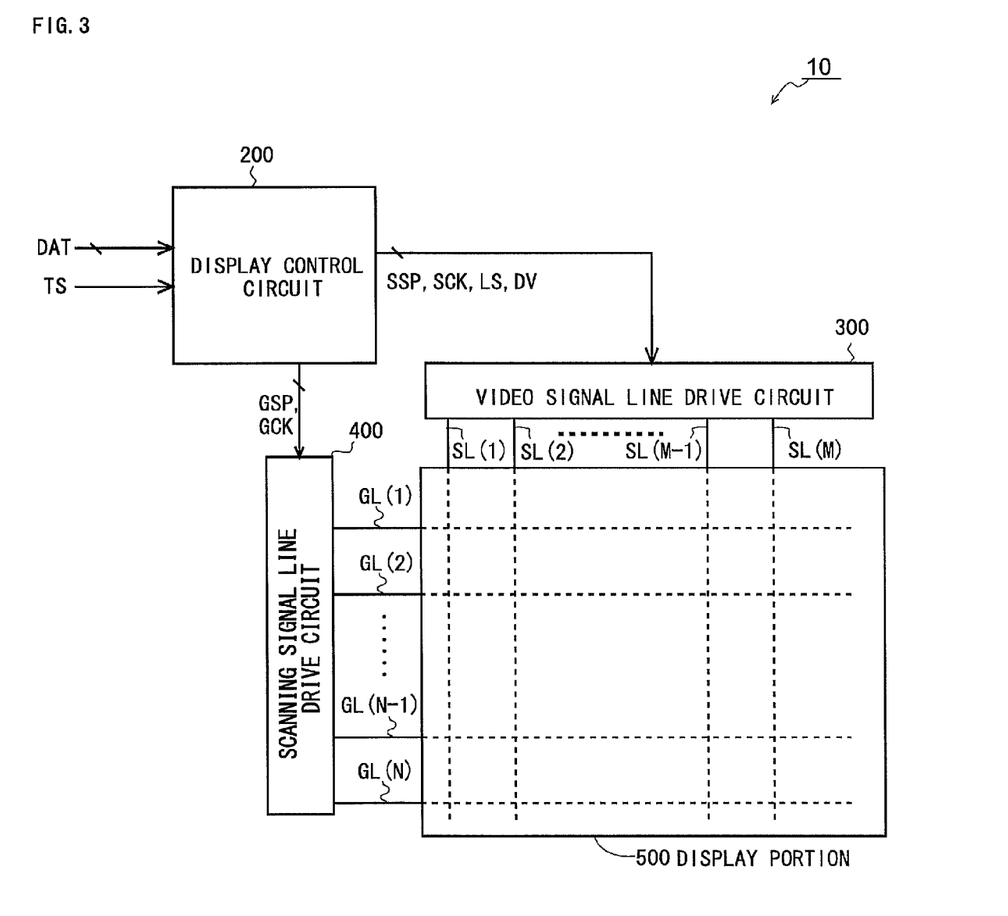
FIG. 3 is a block diagram showing a whole configuration of a first display device in the embodiment.

FIG. 3 is a block diagram showing a whole configuration of an active matrix-type liquid crystal display device which is the first display device according to the first embodiment of the present invention. The first display device 10 is provided with a display control circuit 200, a video signal line drive circuit 300, a scanning signal line drive circuit (gate driver) 400, and a display portion 500.

Figure 4:
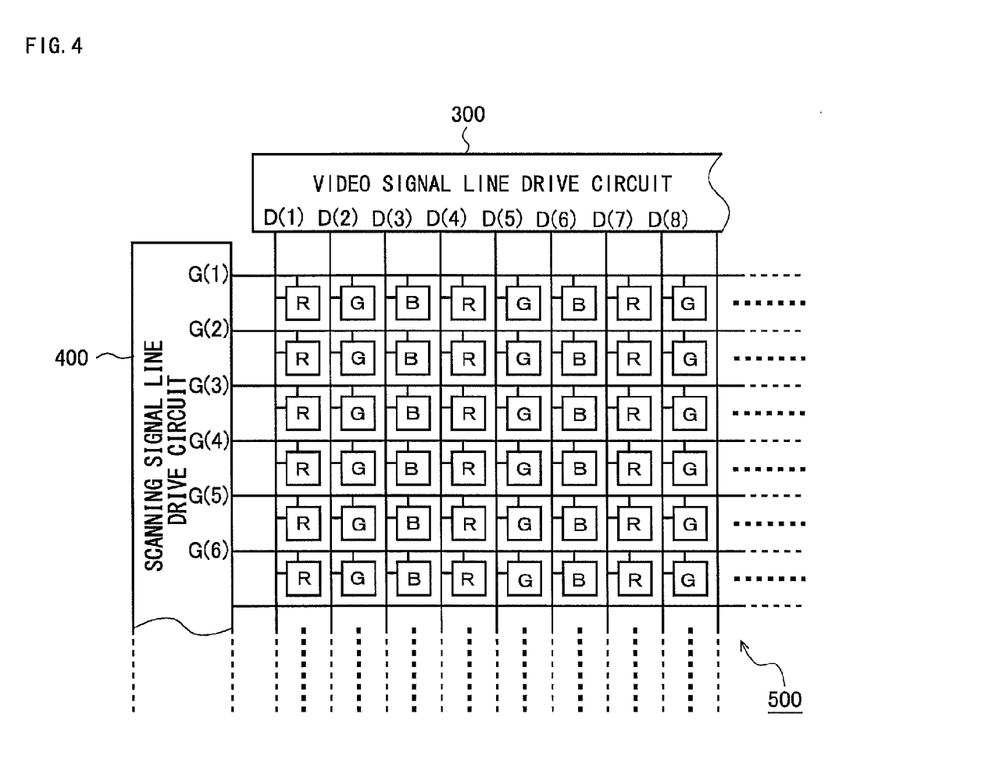
FIG. 4 is a schematic diagram showing a configuration of a display portion in the first display device in the embodiment.
Figure 5:
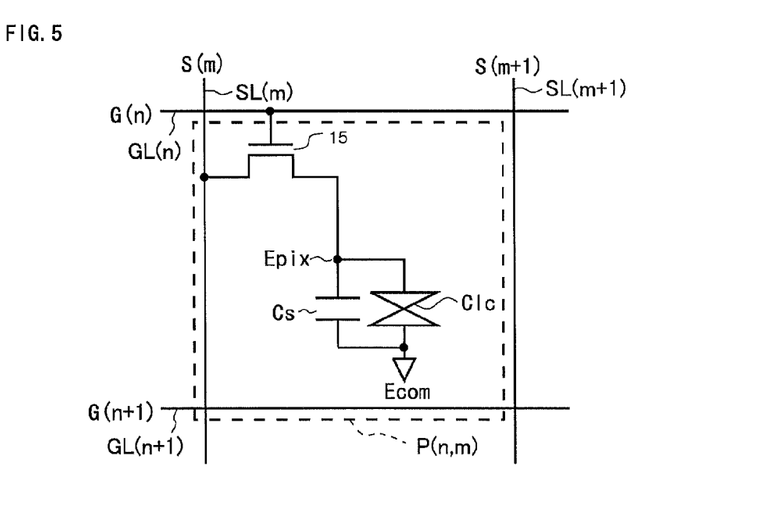
FIG. 5 is an equivalent circuit diagram of a pixel formation portion P(n, m) included in the display portion in the embodiment.

The display portion 500 shown in FIG. 3 includes a plurality of (M) video signal lines SL(1) to SL(M), a plurality of (N) scanning signal lines GL(1) to GL(N), and a plurality of (M×N) pixel formation portions provided respectively corresponding to intersections of the plurality of video signal lines SL(1) to SL(M) and the plurality of scanning signal lines GL(1) to GL(N) (hereinafter, a pixel formation portion corresponding to an intersection of a scanning signal line GL(n) and a video signal line SL(m) is denoted by reference symbol "P(n, m)"), and has a configuration as shown in FIGS. 4 and 5. Here, FIG. 4 schematically shows a configuration of the display portion 500 in the first display device, and FIG. 5 shows an equivalent circuit of the pixel formation portion P(n, m) in the display portion 500.

As shown in FIGS. 4 and 5, each pixel formation portion P(n, m) is formed of: a TFT (Thin Film Transistor) 15 as a switching element whose gate terminal is connected to the scanning signal line GL(n) passing through the corresponding intersection and whose source terminal is connected to the video signal line SL(m) passing through that intersection; a pixel electrode Epix connected to a drain terminal of the TFT 15; a common electrode (also referred to as "counter electrode") Ecom commonly provided in the plurality of pixel formation portions P(i, j) (i=1 to N, j=1 to M); and a liquid crystal layer as an electric optical element which is commonly provided in the plurality of pixel formation portions P(i, j) (i=1 to N, j=1 to M) and placed between the pixel electrode Epix and the common electrode Ecom.

In the TFT 15, amorphous silicon that can be easily manufactured at low cost is often used as a semiconductor layer when a high-speed response and a small current leakage are not highly required. In this case, however, since the pause drive may be performed as described later, it is assumed that an In—Ga—Zn—O type oxide semiconductor with a very small current leakage (specifically it is smaller by one digit or more as compared to the case of using amorphous silicon) is used. Naturally, it is also possible to use another known semiconductors amorphous silicon such as the amorphous silicon or continuous grain silicon although there is a problem of a current leakage.

Note that in FIG. 4, each of symbols "R", "G" and "B" given to each pixel formation portion P(n, m) shows that a color displayed by that pixel formation portion P(n, m) is any of "red", "green" and "blue". Therefore, actually, pixels with the respective colors of RGB formed by the respective pixel formation portions of RGB make a set to form one color pixel.

Further, it is assumed here that there is adopted a line-reversal drive system as a drive system in which an applied voltage to a common electrode is reversed by a common electrode drive circuit, not shown, and the positive/negative polarity of an applied voltage to pixel liquid crystal is reversed with respect to each row in the display portion 500 and is also reversed with respect to each one frame.

As shown in FIG. 5, in each pixel formation portion P(n, m), a liquid crystal capacitance Clc is formed by the pixel electrode Epix and the common electrode Ecom which is opposite to the pixel electrode Epix with the liquid crystal layer placed therebetween, and an auxiliary capacitance Cs is formed in the vicinity thereof.

When a scanning signal G(n) which is applied to the scanning signal line GL(n) becomes active, the scanning signal line GL(n) is selected and the TFT 15 comes into a conducting state. Then, a driving video signal S(m) is applied to the pixel electrode Epix via the video signal line SL(m). Thereby, a voltage of the applied driving video signal S(m) (a voltage with a potential of the common electrode Ecom taken as a reference) is written as a pixel value into the pixel formation portion P(n, m) including the pixel electrode Epix.

Note that, since the pixel formation portion P(n, m) performs a display by controlling a transmittance of light from (a light guiding plate of) a backlight apparatus, the pixel formation portion P(n, m) including the backlight apparatus is referred to as a display element in the present specification.

The display control circuit 200 receives a display data signal DAT and a timing control signal TS transmitted from the outside, and outputs a digital image signal DV, and a source start pulse signal SSP, a source clock signal SCK, a latch strobe signal LS, a gate start pulse signal GSP, and a gate clock signal GCK which are for controlling the timing for displaying an image on the display portion 500. Further, the display control circuit 200 generates the signals such that operation of a normal drive mode (or normal mode) for performing successive driving or operation of a pause drive mode (or pause mode) for performing intermittent drive is performed. Such operations will be described later.

The video signal line drive circuit 300 receives the digital image signal DV, the source start pulse signal SSP, the source clock signal SCK, and the latch strobe signal LS which are outputted from the display control circuit 200, and applies a driving video signal to each of the video signal lines SL(1) to SL(M) in order to charge the pixel capacitance of each pixel formation portion P(n, m) in the display portion 500. At this time, in the video signal line drive circuit 300, the digital image signal DV showing a voltage to be applied to each of the video signal lines SL(1) to SL(M) is sequentially held at the timing at which a pulse of the source clock signal SCK is generated. Then, the held digital image signal DV is converted to an analog voltage at the timing at which a pulse of the latch strobe signal LS is generated. The converted analog voltage is applied as the driving video signal to all of the video signal lines SL(1) to SL(M) at once. That is, in the present embodiment, a line-sequential drive system has been adopted as a drive system for the video signal lines SL(1) to SL(M). Note that the polarity of a video signal that is applied to each of the video signal lines SL(1) to SL(M) is reversed due to AC driving of the display portion 500.

During a normal operation period, the scanning signal line drive circuit 400 sequentially applies an active scanning signal to each of the scanning signal lines GL(1) to GL(N) based on the gate start pulse signal GSP and the gate clock signal GCK which are outputted from the display control circuit 200.

Further, during a pause period (scanning-stopped period) described later, the scanning signal line drive circuit 400 simultaneously applies a predetermined potential to each of the scanning signal lines GL(1) to GL(N). This potential may be the same as a non-active scanning signal potential that is given to each of the scanning signal lines GL(1) to GL(N) in a non-selected state during a scanning period, or may be a previously-set known fixed potential such as a common electrode potential, so long as it is not each of active scanning signals G(1) to G(N), namely, so long as it is a potential capable of bringing the scanning signal line into the non-selected state. Further, in a similar manner, the video signal line drive circuit 300 simultaneously applies a predetermined potential (which is different from or the same as the potential) to each of the video signal lines SL(1) to SL(M) during the pause period described later. These operations during the pause period will be described later.

Here, the polarity of each of the driving video signals S(1) to S(M) which is applied to each of the video signal lines SL(1) to SL(M) is reversed with respect to each row as described above. For example, the polarity of the driving video signals S(1) to S(M) at the time when the active scanning signal G(1) is being applied to the scanning signal line GL(1) is invese to the polarity of the driving video signals S(1) to S(M) at the time when the active scanning signal G(2) is being applied to the scanning signal line GL(2). Further, for reducing consumption power, a common electrode potential Vcom applied to the common electrode Ecom is selected from two predetermined potentials by the common electrode drive circuit, not shown, so as to have an opposite phase to that of the polarity reversal. Note that the display control circuit 200 generates a polarity inversion signal $\phi$ showing the timing for the polarity inversion, and outputs the signal $\phi$ to the common electrode drive circuit, not shown, and the video signal line drive circuit 300. Such a configuration realizes line-reversal driving.

Thus, by application of the driving video signal to each of the video signal lines SL(1) to SL(M) and application of the scanning signal to each of the scanning signal lines GL(1) to GL(N), an image is displayed on the display portion 500. Note that an auxiliary capacitance line CsL is supplied with a predetermined voltage by a power supply circuit, not shown, and held at the same potential, but it may be similarly driven by a similar circuit to the common electrode driving circuit, not shown. Next, with reference to FIG. 6, a description will be given of an operation of mode control performed by the terminal control apparatus 30 on the display control circuit 200 that is provided in each of the first and second display devices 10, 20.

1.3 Operation of Mode Control Performed by Terminal Control Apparatus

Figure 6:
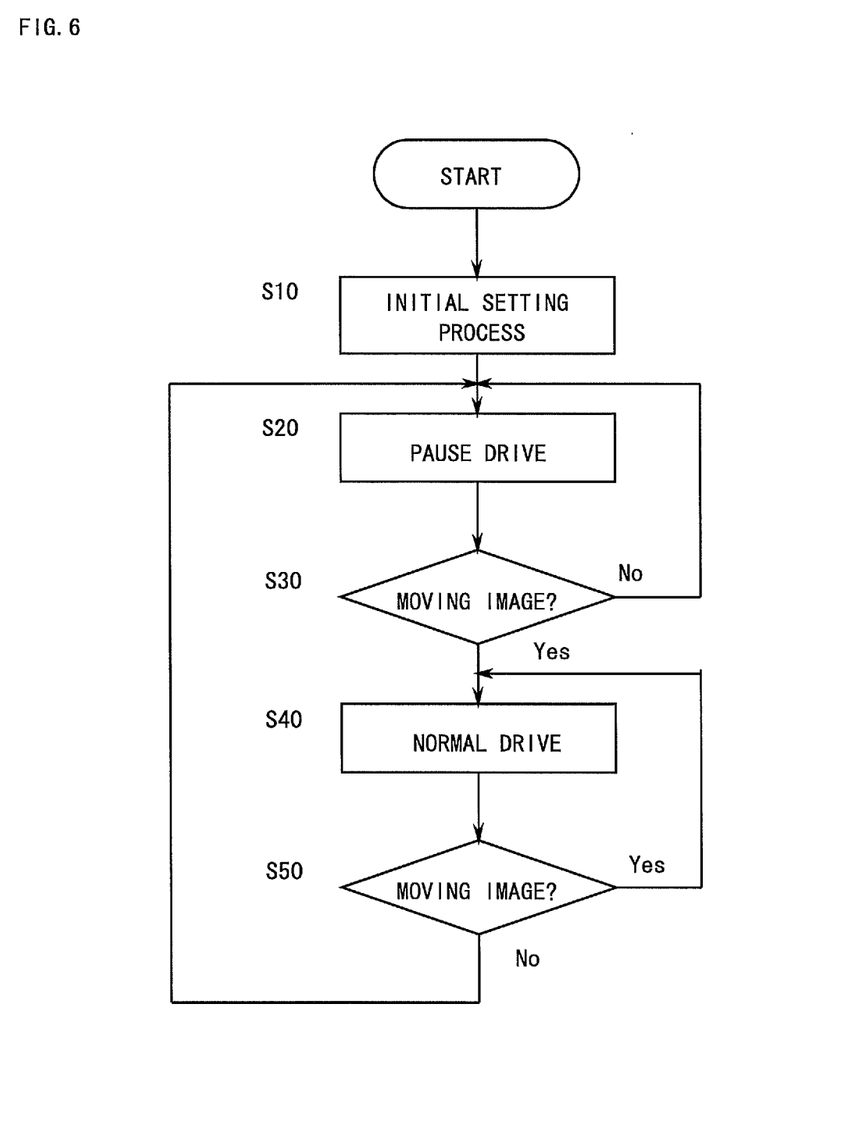
FIG. 6 is a flowchart showing a flow of a mode control process for switching between normal drive and pause drive in the embodiment.

FIG. 6 is a flowchart showing a flow of a mode control process for switching between the normal drive and the pause drive. Note that the mode control process is independently performed on the display control circuit 200 provided in each of the first and second display devices 10, 20 (i.e., with one mode not depending on the other).

In Step S10 shown in FIG. 6, the terminal control apparatus 30 performs an initial setting process for performing the control operation on the display control circuit 200. Note that, although the control here is control on the display control circuit 200 provided in either the first display device 10 or the second display device 20, it will be expressed as if being control simply on the display control circuit 200 for convenience of description.

Subsequently, in Step S20, the terminal control apparatus 30 controls the display control circuit 200 so as to perform the pause drive (intermittent drive). Note that a control form during the pause drive will be described in detail later since it is different between the first display device 10 and the second display device 20.

Next, in Step S30, the terminal control apparatus 30 determines whether or not a content of the display data signal DAT that is given to the display control circuit 200 is moving image data. A variety of techniques are applicable as methods for the determination, and for example, if an image changes in two or more successive frames, the image is determined to be a moving image. As a result of the determination, if it is determined that the content of the display data signal DAT is moving image data (Yes in Step S30), an operation in the normal drive mode is performed (Step S40). If it is determined that the content of the display data signal DAT is not moving image data (No in Step S30), the process returns to Step S20, and the operation (in the pause drive mode) is repeated until the content of the display data signal DAT is determined to be moving image data (S30→S20→S30).

Subsequently, in Step S50 similarly to Step S30, the terminal control apparatus 30 determines whether or not the content of the display data signal DAT that is given to the display control circuit 200 is moving image data. As a result of the determination, if it is determined that the content of the display data signal DAT is moving image data (Yes in Step S50), the process returns to Step S40, and the operation (in the normal drive mode) is repeated until the content of the display data signal DAT is determined not to be moving image data (S50→S40→S50). If it is determined that the content of the display data signal DAT is not moving image data (No in Step S50), the process returns to Step S20, and the operation in the pause drive mode is performed and a similar operation is repeated thereafter.

Here, the operation of the terminal control apparatus 30 in Step S20 above will be described in detail. The terminal control apparatus 30 controls the display control circuit 200 provided in each of the first and second display devices 10, 20 so as to perform pause drive accompanied by a drive form and a consumption power fluctuation as shown in each of FIGS. 7 and 8.

Figure 7:
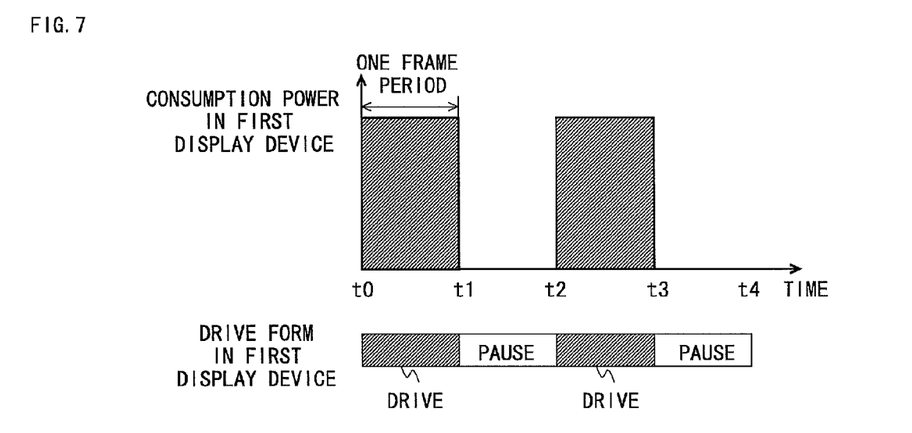
FIG. 7 is a diagram showing a drive form and a consumption power fluctuation in the first display device at the time of pause drive in the embodiment.
Figure 8:
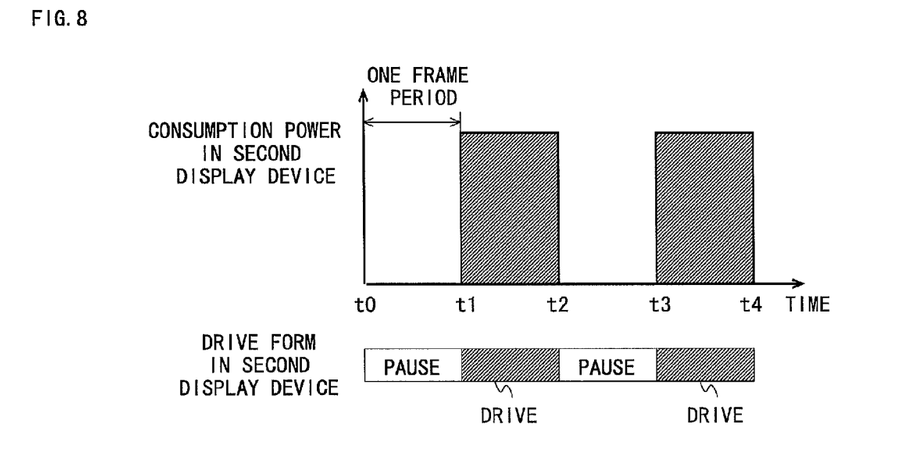
FIG. 8 is a diagram showing a drive form and a consumption power fluctuation in a second display device at the time of pause drive in the embodiment.

FIG. 7 is a diagram showing a drive form and a consumption power fluctuation in the first display device at the time of pause drive, and FIG. 8 is a diagram showing a drive form and a consumption power fluctuation in the second display device at the time of pause drive.

As shown in FIG. 7, the scanning signal line drive circuit 400 provided in the first display device 10 sequentially outputs the active scanning signals G(1) to G(N) in one frame period (here, 1/60 [sec]) from time t0 to time t1. In addition, it is as described before that, during the drive operation period (scanning period), the video signal line drive circuit 300 outputs (by the line-sequential drive system) the driving video signals S(1) to S(M) with the polarity thereof inverted with respect to each row.

When the scanning period is over, during a pause period which is a scanning-stopped period from the time t1 to time t2, the scanning signals G(1) to G(N) and the driving video signals S(1) to S(M) are not outputted, and each of the scanning signal lines GL(1) to GL(N) and each of the video signal lines SL(1) to SL(M) are held (fixed) at predetermined potentials. Hence a pixel potential of a pixel formation portion P(1, 1) also remains unchanged. Note that, although the pixel potential gradually decreases in actuality during the pause period due to the current leakage of the TFT 15 described above, it is ignored here as the current leakage is very small. When the operation during the pause period is then over, a similar operation is performed in the next two frame periods from the time t2 to time t4, and the operation is also repeated thereafter. In such a manner, during the pause drive, the driving by the video signal line drive circuit 300 and the scanning signal line drive circuit 400, which are provided in the first display device 10, is intermittently performed.

Note that, although the lengths of the scanning period and the pause period are both 1/60 [sec], these values are naturally one example, and may be other known values. However, with the pause period being provided for the purpose of lowering consumption power, normally, its length is preferably a length not shorter than (typically about several times to several tens of times or more longer than) that of the scanning period, and for example, a pause period of a several seconds is preferably provided.

Further, as shown in FIG. 8, in the scanning signal line drive circuit 400 provided in the second display device 20, one frame period from the time t0 to the time t1 is a pause period and one frame period from the time 1 to the time t2 is a scanning period, contrary to those in the case shown in FIG. 7 above. When the operation during the scanning period is then over, a similar operation is performed in the next two frame periods from the time t2 to the time t4, and the operation is also repeated thereafter. In such a manner, during the pause drive, the driving by the video signal line drive circuit 300 and the scanning signal line drive circuit 400 provided in the second display device 20 is also intermittently performed in a similar manner to the first display device 10, but the scanning period and the pause period are opposite thereto. Accordingly, when one of the first and second display devices 10, 20 is in the scanning period, the other is in the pause period, and hence a peak of consumption power of the whole display device (portable terminal) 100 is suppressed as shown in FIG. 9.

Figure 9:
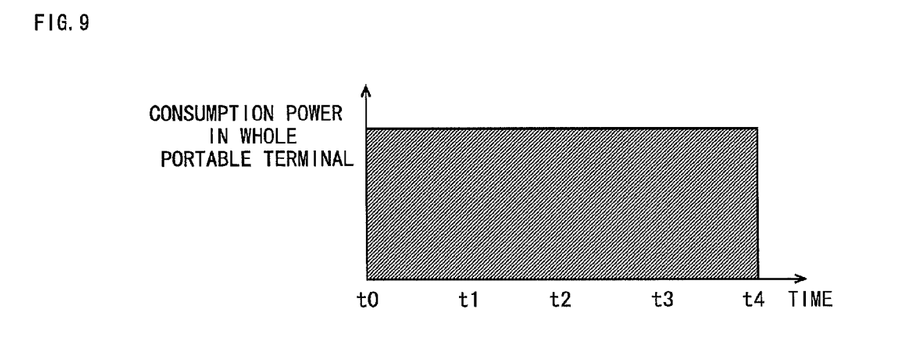
FIG. 9 is a diagram schematically showing a change in consumption power of a portable terminal in the embodiment.
Figure 10:
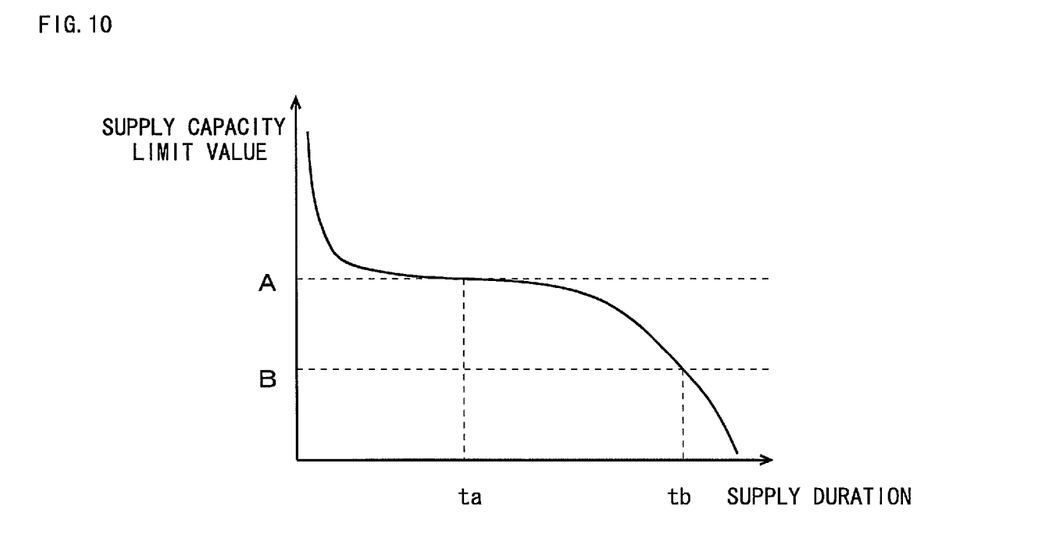
FIG. 10 is a diagram showing a relationship between a limit value of a current supply capability and current supply duration in a battery in the embodiment.

FIG. 9 is a diagram schematically showing a change in consumption power of the portable terminal. As shown in FIG. 9, since a total value of the consumption power of the first and second display devices 10, 20 becomes substantially constant and the other consumption power substantially remains unchanged, the consumption power of the portable terminal 100 becomes substantially constant. Here, if the driving is not performed in such a form as in the present embodiment and, for example, both the first and second display devices 10, 20 are in the scanning period at the same timing, consumption power during that period becomes twice as large as the consumption power shown in FIG. 9 at the maximum. Naturally, since the consumption power during the pause period becomes close to zero, the consumption power in the whole period with the portable terminal 100 being in operation remains unchanged, but a consumption power amount at the peak changes. As shown in FIG. 10, this causes reduction in duration of a battery, not shown, provided in the portable terminal 100.

FIG. 10 is a diagram showing a relationship between a limit value of a current supply capability and the current supply duration in the battery. As shown in FIG. 10, it is known that the longer the time for current supply by the battery becomes, the more the limit value of the current supply capability of the battery, namely the maximum value of an instantaneous obtained current supply amount, decreases. For example, when the limit value (maximum value) of the instantaneous current supply amount given from the battery to the portable terminal 100 is A in the figure, its duration is ta, and at a time point thereafter, the current of the maximum value A cannot be obtained. In contrast, when the limit value (maximum value) of the instantaneous current supply amount is B which is lower than A in the figure, its duration is tb which is longer than ta. As thus described, the lower the limit value of the current supply capability of the battery, the longer the current supply duration of the battery, and hence the battery service life is prolonged (i.e., driving by the battery for a longer time is possible) even when a total amount of current (electric energy) supplied from the battery is equal.

1.4 Effect

As described above, in the present embodiment, in the display device such as the portable terminal provided with the two display panels (including the case of being) driven by the battery, when driving for inserting the scanning-stopped period (pause period) in both of the two display panels is to be performed, an instantaneous increase in consumption power is suppressed by means of the configuration to perform control such that the scanning period in one of the two display panels is inserted during the scanning-stopped period in the other display panel, namely during the drive operation (for writing into the pixel circuit) of one of the two display panels, the drive operation (for writing) of the other display panel is not performed. Accordingly, even when the limit value of the current supply capability of the battery is low, the display device can be driven, thereby making it possible to prolong the battery service life and increase the operable time of the portable terminal 100 at the time of driving by the battery.

2. Second Embodiment 2.1 Whole Configuration and Operation of Display Device

Since a whole configuration of a display device (portable terminal) in the present embodiment is similar to the configuration of the active matrix-type liquid crystal display device in the first embodiment shown in FIG. 1, a description thereof will be omitted.

Figure 11:
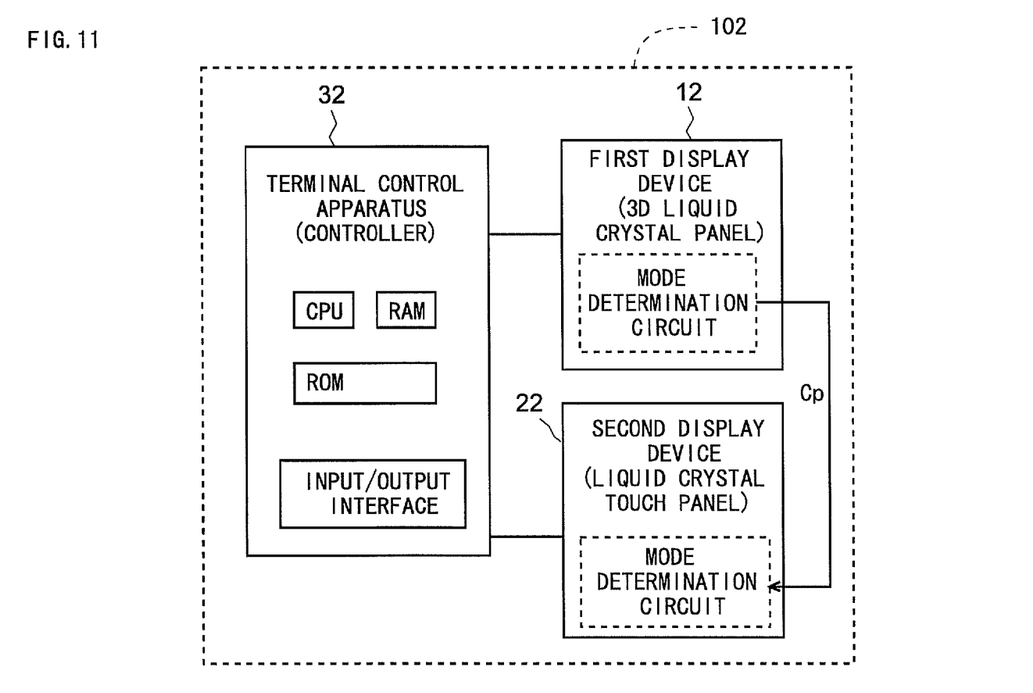
FIG. 11 is a block diagram showing a whole configuration of a display device according to a second embodiment of the present invention.

In the present embodiment, unlike the case of the first embodiment, the switching control (mode determination) between the pause drive and the normal drive is not performed in the terminal control apparatus 32, but it is performed in mode determination circuits incorporated in first and second display devices 12, 22 as shown in FIG. 11. That is, the two mode determination circuits function as control portions for switching between the normal drive and the pause drive.

FIG. 11 is a block diagram showing the whole configuration of the display device according to the second embodiment. A display device (portable terminal) 102 shown in FIG. 11 is provided with the first display device 12 which is the 3D liquid crystal panel 11, a second display device 22 which is the liquid crystal touch panel 12, and a terminal control apparatus 32 which is a controller. Since the constitutional elements are similar to those in the case of the first embodiment except for a configuration and an operation related to the mode determination and the determination result, descriptions thereof will be omitted, and with reference to FIGS. 12 and 13, a description will be given hereinafter of a control operation of the mode determination circuit incorporated in each of the first and second display devices 12, 22 as an operation of the control portion related to the mode determination.

2.2 Mode Determination Operation in First and Second Display Devices

Figure 12:
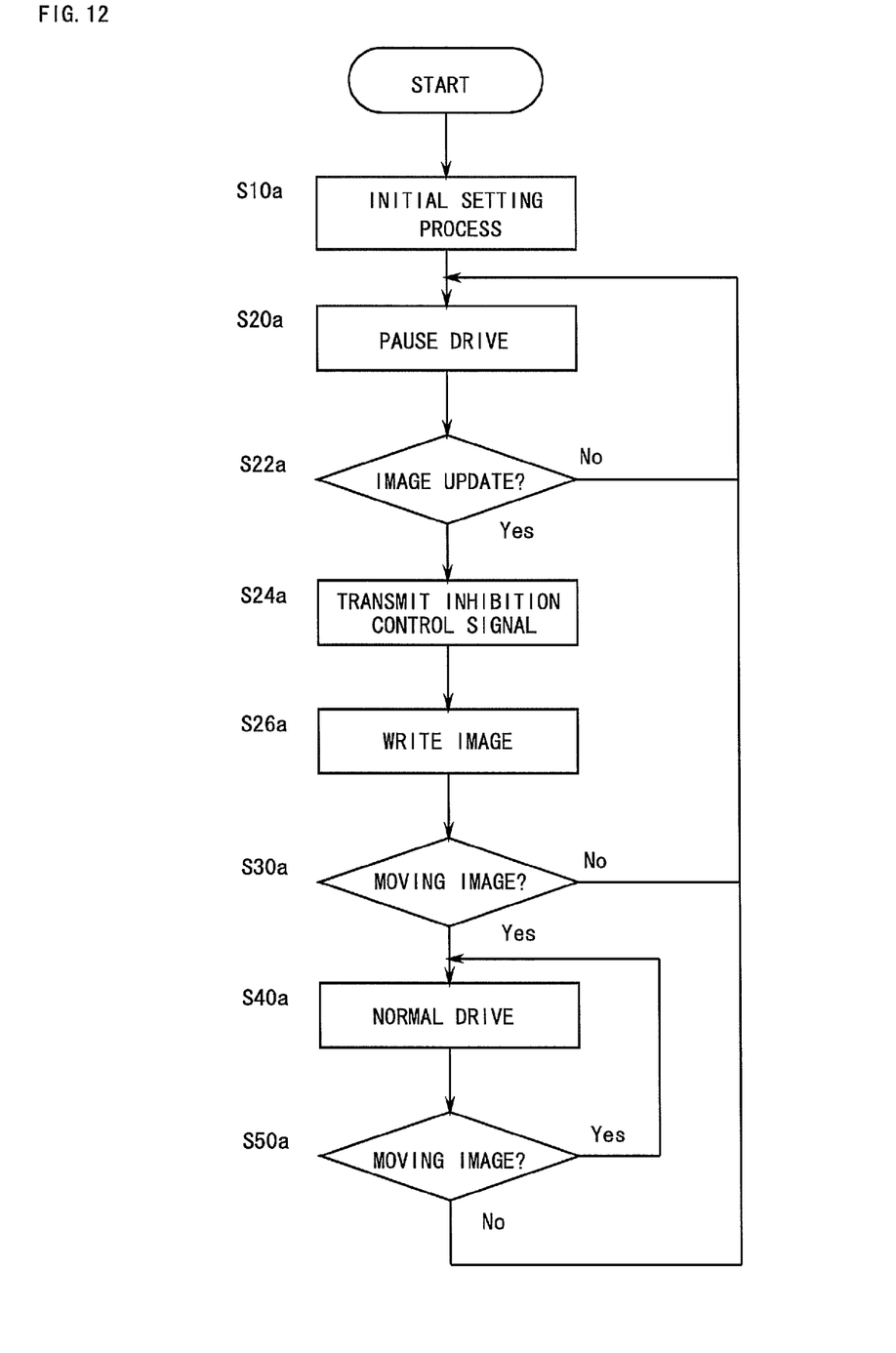
FIG. 12 is a flowchart showing a flow of a control process for a mode determination circuit incorporated in a first display device out of operations of a control portion for switching between normal drive and pause drive in the embodiment.

FIG. 12 is a flowchart showing a flow of a control process for the mode determination circuit incorporated in the first display device 12 out of the operations of the control portion for switching between the normal drive and the pause drive. Further, FIG. 13 is a flowchart showing a flow of a control process for the mode determination circuit incorporated in the second display device 22 out of the operations of the control portion for switching between the normal drive and the pause drive.

Figure 13:
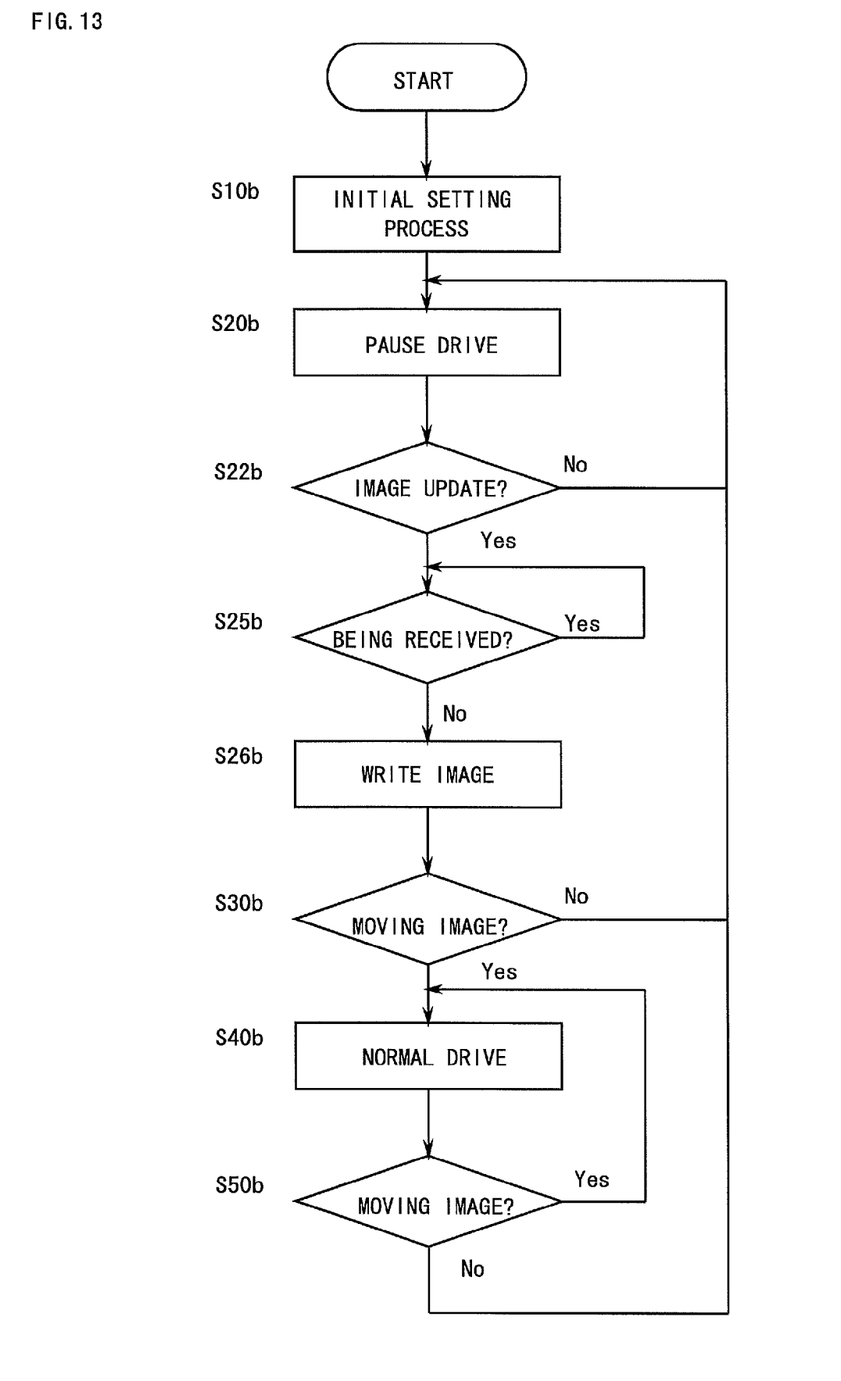
FIG. 13 is a flowchart showing a flow of a control process for a mode determination circuit incorporated in a second display device out of operations of the control portion for switching between the normal drive and the pause drive in the embodiment.

Both processes in Steps S10a, 20a, 30a, 40a, 50a shown in FIG. 12 and processes in Steps S10b, 20b, 30b, 40b, 50b shown in FIG. 13 are substantially the same as the processes in Steps S10 to S50 shown in FIG. 6. Hence descriptions thereof will be omitted, and a description will be given focusing on other characteristic configurations.

First, in Step S22a shown in FIG. 12, the mode determination circuit incorporated in the first display device 12 determines whether or not an image update (image change) has been made in a display data signal DAT that is given from the terminal control apparatus 32 during pause drive (Step S20a). Here, other than the case of an image content being a moving image, during the pause drive, cases of the image update are considered to be the case of a content of a still image being switched, the case of a periodical image update, namely necessary re-writing of an image as a refresh operation during the pause drive even when the content of the still image remains unchanged, or some other case.

If the image update has not been made as a result of the determination (No in Step S22a), the process returns to Step S20a, the operation in the pause drive mode is performed, and the process is repeated until the image update is made (S22a→S20a→S22a). If the image update has been made (Yes in Step S22a), the process proceeds to Step S24a, and an inhibition control signal Cp is transmitted from the mode determination circuit incorporated in the first display device 12 to the mode determination circuit incorporated in the second display device 22 (Step S24a).

Immediately thereafter, in Step S26a, the mode determination circuit incorporated in the first display device 12 controls the display control circuit 200 of the first display device 12 so as to write the (updated) image, and subsequently determines whether or not the image is a moving image (S30a). If it is determined that the image is a moving image, the mode determination circuit performs the normal drive (S40a), and continues the process until the image is determined not to be a moving image, and if it is determined that the image is not a moving image, the mode determination circuit returns to the pause drive (S20a). In addition, it is assumed that in Step S26a, the mode determination circuit incorporated in the first display device 12 stops the inhibition control signal Cp with respect to the display control circuit 200 of the first display device 12 at the time of finishing writing the (updated) image.

Thus, it is different from the case of the first embodiment in that, when the image update has been made, the first display device 12 transmits the inhibition control signal Cp to the second display device 22 (and that the updated image is immediately written). Further, the operation of the mode control circuit in the second display device 22 is similar to the operation of the mode control circuit in the first display device 12, but is different in some respects.

First, in Step S22b shown in FIG. 13, similarly to the case of Step S22a shown in FIG. 12, the mode determination circuit incorporated in the second display device 22 determines whether or not an image update (image change) has been made in a display data signal DAT that is given from the terminal control apparatus 32 during pause drive (Step S20b).

If the image update has not been made as a result of the determination (No in Step S22b), the process returns to Step S20b, the operation in the pause drive mode is performed, and the process is repeated until the image update is made (S22b→S20b→S22b). If the image update has been made (Yes in Step S22b), the process proceeds to Step S25b, and it is determined whether or not the inhibition control signal Cp transmitted from the mode determination circuit incorporated in the first display device 12 has been received (Step S25b).

As a result of the determination, if the signal is being received (Yes in Step S25b), it is again determined whether or not the signal Cp has been received and the operation is repeated (i.e., the drive operation is not performed) until it is determined that the signal is not being received. If the signal is not being received (No in Step S25b), in Step S26b, similarly to Step S26a, the mode determination circuit incorporated in the second display device 22 controls the display control circuit 200 of the second display device 22 so as to write the (updated) image, and also performs a similar operation thereafter. Here, the pause drive as thus performed is pause drive accompanied by a drive form and a consumption power fluctuation as shown in each of FIGS. 14 and 15.

Figure 14:
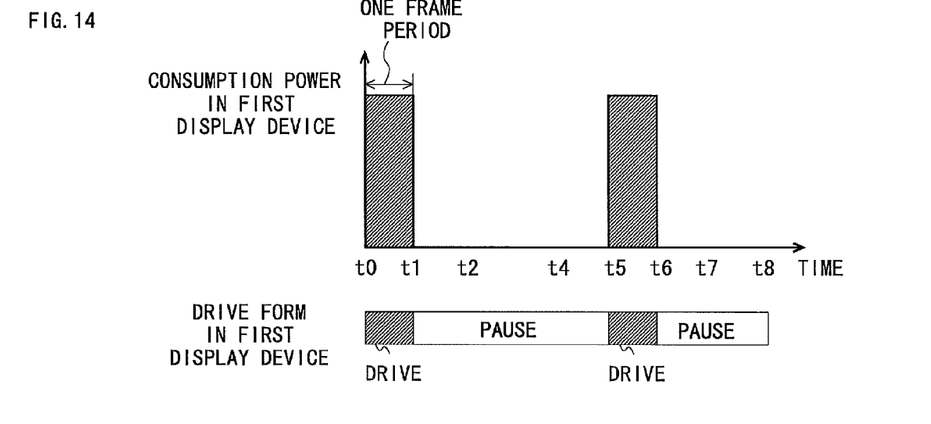
FIG. 14 is a diagram showing a drive form and a consumption power fluctuation in the first display device at the time of pause drive in the embodiment.
Figure 15:
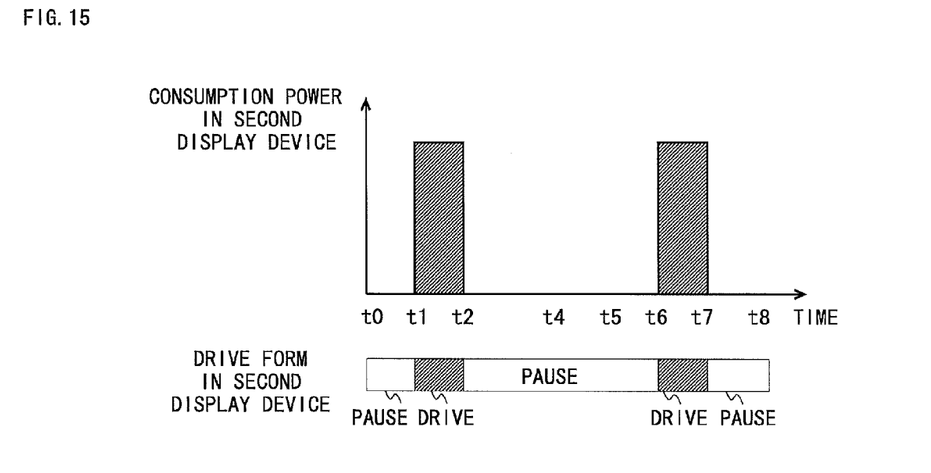
FIG. 15 is a diagram showing a drive form and a consumption power fluctuation in the second display device at the time of pause drive in the embodiment.

FIG. 14 is a diagram showing a drive form and a consumption power fluctuation in the first display device at the time of pause drive, and FIG. 15 is a diagram showing a drive form and a consumption power fluctuation in the second display device at the time of pause drive.

As shown in FIG. 14, the scanning signal line drive circuit 400 provided in the first display device 12 sequentially outputs the active scanning signals G(1) to G(N) in one frame period (here, also 1/60 [sec] similarly to the case of the first embodiment) from time t0 to time t1.

When the scanning period is over, during a pause period which is a scanning-stopped period from the time t1 to time t5, the scanning signals G(1) to G(N) and the driving video signals S(1) to S(M) are not outputted, and each of the scanning signal lines GL(1) to GL(N) and each of the video signal lines SL(1) to SL(M) are held (fixed) at predetermined potentials. When the operation during the pause period is over, the operation (drive operation) of writing into the pixel formation portion is performed in subsequent one frame period from the time t5 to time t6, and the operation is also repeated thereafter. In such a manner, during the pause drive, the driving by the video signal line drive circuit 300 and the scanning signal line drive circuit 400, which are provided in the first display device 12, is intermittently performed. However, although the length of the pause period is a length (1/15 [sec]) four times longer than the length of the scanning period, the values are one examples, and may be other known values.

Further, as shown in FIG. 15, in the scanning signal line drive circuit 400 provided in the second display device 22, one frame period from the time t0 to the time t1 is a pause period, unlike the drive form shown in FIG. 14 above. This is because the inhibition control signal Cp continues to be transmitted from the first display device for the period from the time t0 to the time t1. Thereafter, when transmission (reception) of the inhibition control signal Cp is over at the time t1, writing for the image update is started, and a period from the time t1 to the time t2 is a scanning period. When the operation during the scanning period is then over, a similar operation is also performed from the time t2 to the time t6, and the operation is also repeated thereafter.

In such a manner, during the pause drive, the driving by the video signal line drive circuit 300 and the scanning signal line drive circuit 400 provided in the second display device 22 is also intermittently performed in a similar manner to the first display device 12, but that scanning period is surely during the pause period in the first display device 12. Accordingly, when the first display device 12 is in the scanning period, the second display device 22 is in the pause period, and hence a peak of consumption power of the whole display device (portable terminal) 102 is suppressed as shown in FIG. 16.

Figure 16:
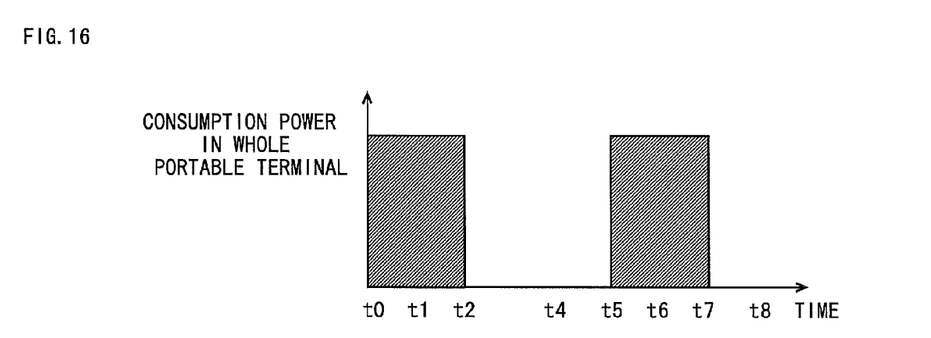
FIG. 16 is a diagram schematically showing a change in consumption power of a portable terminal in the embodiment.

FIG. 16 is a diagram schematically showing a change in consumption power of the portable terminal. As shown in FIG. 16, the consumption power of the first and second display devices 12, 22 is held low similarly to the case shown in FIG. 9, and it is about half of consumption power that is required when both the first and second display devices 12, 22 are in the scanning period at the same timing. Naturally, as described above, the consumption power in the whole period with the portable terminal 102 being in operation remains unchanged, but a consumption power amount at the peak changes. Similarly to the case of the first embodiment, this allows increasing in duration of a battery, not shown, provided in the portable terminal 102, as shown in FIG. 10.

2.3 Effect

As described above, similarly to the first embodiment, in the present embodiment, in the display device such as the portable terminal provided with the two display panels (including the case of being) driven by the battery, when driving for inserting the scanning-stopped period (pause period) in both of the two display panels is to be performed, an instantaneous increase in consumption power is suppressed by means of the configuration to perform control such that the scanning period in one of the two display panels is inserted during the scanning-stopped period in the other display panel, namely during the drive operation (for writing into the pixel circuit) of one of the two display panels, the drive operation (for writing) of the other display panel is not performed. Accordingly, even when the limit value of the current supply capability of the battery is low, the display device can be driven, thereby making it possible to prolong the battery service life and increase the operable time of the portable terminal 102 at the time of driving by the battery.

Further, when the image update is made during the pause drive (intermittent drive), a display on the first display device 12 is prioritized, a display on the second display device 22 is stopped during that time, and the display on the second display device 22 is started after the end of the display on the first display device 12. Therefore, even not in a case where the relationship between the drive operation period and the pause period during the pause drive is fixed (the timing is previously decided) as in the case of the first embodiment, control is performed such that during the drive operation (for writing into the pixel circuit) of one of the two display panels, the drive operation (for writing) of the other display panel is not performed. This configuration can reliably suppress an instantaneous increase in consumption power, prolong the battery service life, and increase the operable time of the portable terminal 102 at the time of driving by the battery.

3. Modified Example

The first embodiment has been described as having the configuration where the pause period and the drive operation period are alternately switched in the first and second display devices 10, 20, but it is similarly applicable to a case where the pause period is long, as well as a case where the drive operation period during pause drive has been decided, as shown in FIGS. 14 and 15. Further, the mode determination control operation is not necessarily required to be performed in the terminal control apparatus, but may be performed outside the apparatus, or may be performed in each of the first and second display devices 10, 20. However, in this case, a configuration is similar to that in the second embodiment, but it is not necessary to transmit and receive the inhibition control signal or the like between the devices since the driving timing has been decided.

Further, the second embodiment has the configuration where the control operation is performed in the mode determination circuits incorporated in the first and second display devices 12, 22, but it may have a configuration where the whole or part of the control operation is performed by a circuit, a program or the like in the terminal control apparatus 32.

Note that, although the description has been given above by taking the active matrix-type liquid crystal display device as an example, the present invention is applicable to a display device other than the liquid crystal display device so long as it is a display device based on active matrix-type voltage control and provided with a scanning period and a pause period.

The present invention is applied to an active matrix-type liquid crystal display device, and is especially suitable for a display device such as a portable terminal using a plurality of display panels.

DESCRIPTION OF REFERENCE CHARACTERS 10, 12: FIRST DISPLAY DEVICE
11: 3D LIQUID CRYSTAL PANEL
12: LIQUID CRYSTAL TOUCH PANEL
20, 22: SECOND DISPLAY DEVICE
30, 32: TERMINAL CONTROL APPARATUS
100, 102: PORTABLE TERMINAL (DISPLAY DEVICE)
200: DISPLAY CONTROL CIRCUIT
300: VIDEO SIGNAL LINE DRIVE CIRCUIT
400: SCANNING SIGNAL LINE DRIVE CIRCUIT
500: DISPLAY PORTION
G(k): SCANNING SIGNAL (k=1, 2, 3, . . . )
GL(k): SCANNING SIGNAL LINE (K=1, 2, 3)
S(j): VIDEO SIGNAL (j=1, 2, 3, . . . )
SL(j): VIDEO SIGNAL LINE (j=1, 2, 3, . . . )
Cp: INHIBITION CONTROL SIGNAL

The invention claimed is:

1. A display device capable of displaying an image on each of first and second screens, the device comprising:
a first display panel that includes a plurality of two-dimensionally arranged first pixel circuits;
a second display panel that includes a plurality of two-dimensionally arranged second pixel circuits; and
a drive control portion that performs driving:
to perform a first operation of writing a signal, including both a normal drive mode and a pause drive mode, which corresponds to first display data that displays an image on the first screen, into the plurality of first pixel circuits, and
to perform a second operation of writing a signal including both the normal drive mode and the pause drive mode, which corresponds to second display data that displays an image on the second screen, into the plurality of second pixel circuits, and to prevent the first and second operations from being simultaneously performed when both the first and second operations are performing the pause drive mode; wherein
the normal drive mode is defined by successive driving in which no pause periods are inserted; and
the pause drive mode is defined by intermittent driving in which at least one pause period is inserted.

2. The display device according to claim 1, wherein the drive control portion includes:
a first drive circuit that performs the first operation;
a second drive circuit that performs the second operation; and
a control portion that performs control so as to perform the first operation preferentially to the second operation when both the first and second operations are performing the pause drive mode, and to stop the second operation during the first operation.

3. The display device according to claim 2, wherein the control portion determines whether the first and second operations are performing the normal drive mode or the pause drive mode based on the first and second display data, and controls the operations of the first and second drive circuits in accordance with a result of the determination.

4. The display device according to claim 3, wherein the control portion includes:
a first control circuit that determines whether the first operation is performing the normal drive mode or the pause drive mode based on the first display data, and outputs an inhibition signal during a period of the first operation when determining that the first operation performing the pause drive mode; and
a second control circuit that determines whether the second operation is performing the normal drive mode or the pause drive mode based on the second display data, and stops the second operation during an output period of the inhibition signal when determining that the second operation is performing the pause drive mode.

5. The display device according to claim 1, wherein the drive control portion determines whether or not the first or second display data is moving image data, and successively performs a write operation on the corresponding first or second pixel circuit when determining that the first or second display data is moving image data.

6. The display device according to claim 1, wherein at least one of the first and second pixel circuits is provided with a thin film transistor having a semiconductor layer made of an oxide semiconductor.

7. A display method for displaying an image on each of first and second screens, the method comprising:
controlling driving to:
perform a first operation of writing a signal, including both a normal drive mode and a pause drive mode, which corresponds to first display data that displays an image on the first screen, into a plurality of two-dimensionally arranged first pixel circuits included in a first display panel, and
perform a second operation of writing a signal, including both the normal drive mode and the pause drive mode, which corresponds to second display data for displaying an image on the second screen, into a plurality of two-dimensionally arranged second pixel circuits included in a second display panel, and to prevent the first and second operations from being simultaneously performed when both the first and second operations are performing the pause drive mode; wherein
the normal drive mode is defined by successive driving in which no pause periods are inserted; and
the pause drive mode is defined by intermittent driving in which at least one pause period is inserted.

* * * * *